United States Patent [19]

Yasuoka

[11] Patent Number: 4,683,857

[45] Date of Patent: Aug. 4, 1987

[54] METHOD FOR CONTROLLING AIR/FUEL RATIO

[75] Inventor: Akimasa Yasuoka, Tokyo, Japan

[73] Assignee: Honda Giken Kogyo Kabushiki Kaisha, Tokyo, Japan

[21] Appl. No.: 813,016

[22] Filed: Dec. 26, 1985

[30] Foreign Application Priority Data

Dec. 25, 1984 [JP] Japan .................................. 59-271893

[51] Int. Cl.$^4$ ............................................ F02M 51/00
[52] U.S. Cl. .................................... 123/478; 123/494
[58] Field of Search ............... 123/478, 559, 568, 527, 123/528, 494

[56] References Cited

U.S. PATENT DOCUMENTS

| | | | |
|---|---|---|---|
| 4,075,990 | 2/1978 | Ribeton | 123/559 |
| 4,471,742 | 9/1984 | Kishi | 123/478 |
| 4,492,202 | 1/1985 | Murumatsu et al. | 123/478 |
| 4,498,443 | 2/1985 | Hasegawa et al. | 123/478 |
| 4,508,087 | 4/1985 | Yaruoka et al. | 123/494 |
| 4,549,516 | 10/1985 | Koumura | 123/478 |
| 4,549,518 | 10/1985 | Koumura | 123/478 |
| 4,572,122 | 2/1986 | Kamai et al. | 123/494 |

Primary Examiner—Raymond A. Nelli
Attorney, Agent, or Firm—Lyon & Lyon

[57] ABSTRACT

A fuel supply control method for an internal combustion engine. Sensors read out values for engine speed, intake pipe absolute pressure and exhaust pipe absolute pressure. These values are used to determine a corrected value of intake pipe absolute pressure which, in turn, is used to determine the amount of fuel to be supplied to the engine.

6 Claims, 4 Drawing Figures

| Ne \ P_BAC | P_BAC1 | P_BAC2 | --- | P_BACj | --- | P_BAC9 |
|---|---|---|---|---|---|---|
| Ne1 | Ti1.1 | Ti1.2 | | | | |
| Ne2 | Ti2.1 | Ti2.2 | | | | |
| ⋮ | | | | | | |
| Nei | | | | Tiij | | |
| ⋮ | | | | | | |
| Ne9 | | | | | | Ti9.9 |

… 1

METHOD FOR CONTROLLING AIR/FUEL RATIO

BACKGROUND OF THE INVENTION

The field of the present invention is air/fuel control systems for internal combustion engines.

Various methods for controlling air/fuel mixtures in fuel injection type internal combustion engines have been proposed. Generally, air/fuel mixtures are controlled by regulation of the opening time of a fuel injection device. The opening time is usually determined by multiplying a reference value, $T_i$, by various correction coefficients which are determined according to operating conditions. The reference value, $T_i$, is read out from a basic $T_i$ map according to detected values of absolute pressure in the intake passage of the engine and the engine speed.

However, in an internal combustion engine, especially one with a supercharger, a back pressure is often generated which can affect the amount of air which enters the combustion chamber and thus the air/fuel ratio. When an engine with a supercharger is accelerating or decelerating, the back pressure varies greatly due to the inertia of the supercharger. Therefore, the optimum amount of fuel or air to be supplied cannot be determined with only the intake pipe absolute pressure and the engine speed.

A supercharger is a unit for pre-compressing intake air or air/fuel mixture. The supercharger makes use of the pressure generated by gases in the exhaust passage to turn an exhaust turbine which drives a compressor in the intake passage. During acceleration of the engine, the inertia of the exhaust turbine causes a delay in its increase of rotation, causing the engine back pressure to become higher than it would be during normal operation (that is, when the engine is not accelerating or decelerating). As a result, the amount of air introduced into the combustion chamber is lower during acceleration than it would be during normal operation. Therefore, if the same amount of fuel is supplied as is provided during normal operation, the air/fuel mixture becomes overrich, resulting in an increase of fuel consumption, deterioration of exhaust gas characteristics and reduction of engine output. On the other hand, during deceleration the inertia of the supercharger turbine causes a delay in its decrease of rotation, resulting in a back pressure which is lower than that of normal operation and thus a higher amount of air introduction. Therefore, if the normal amount of fuel is supplied, the air/fuel mixture becomes overlean, causing engine performance to deteriorate.

One example of a method for controlling the air/fuel mixture of an internal combustion engine is found in U.S. Pat. No. 4,509,485.

SUMMARY OF THE INVENTION

The present invention is directed to a method for controlling air/fuel mixture in an internal combustion engine with a supercharger so the drivability of the engine might be enhanced, especially when the engine is in a state of acceleration or deceleration. The present invention accomplished this result by first detecting an engine speed, an intake passage absolute pressure and an exhaust gas pressure. The process then determines a corrected value for absolute pressure in the intake passage. A basic control amount of, for example, fuel or air is then determined and finally an operational control amount is derived therefrom. Accordingly, it is an advantage of the present invention to provide an air/fuel mixture which improves the drivability of the engine. Other and further advantages will appear hereinafter.

DETAILED DESCRIPTION OF THE PREFERRED EMBODIMENT

Figure 1:
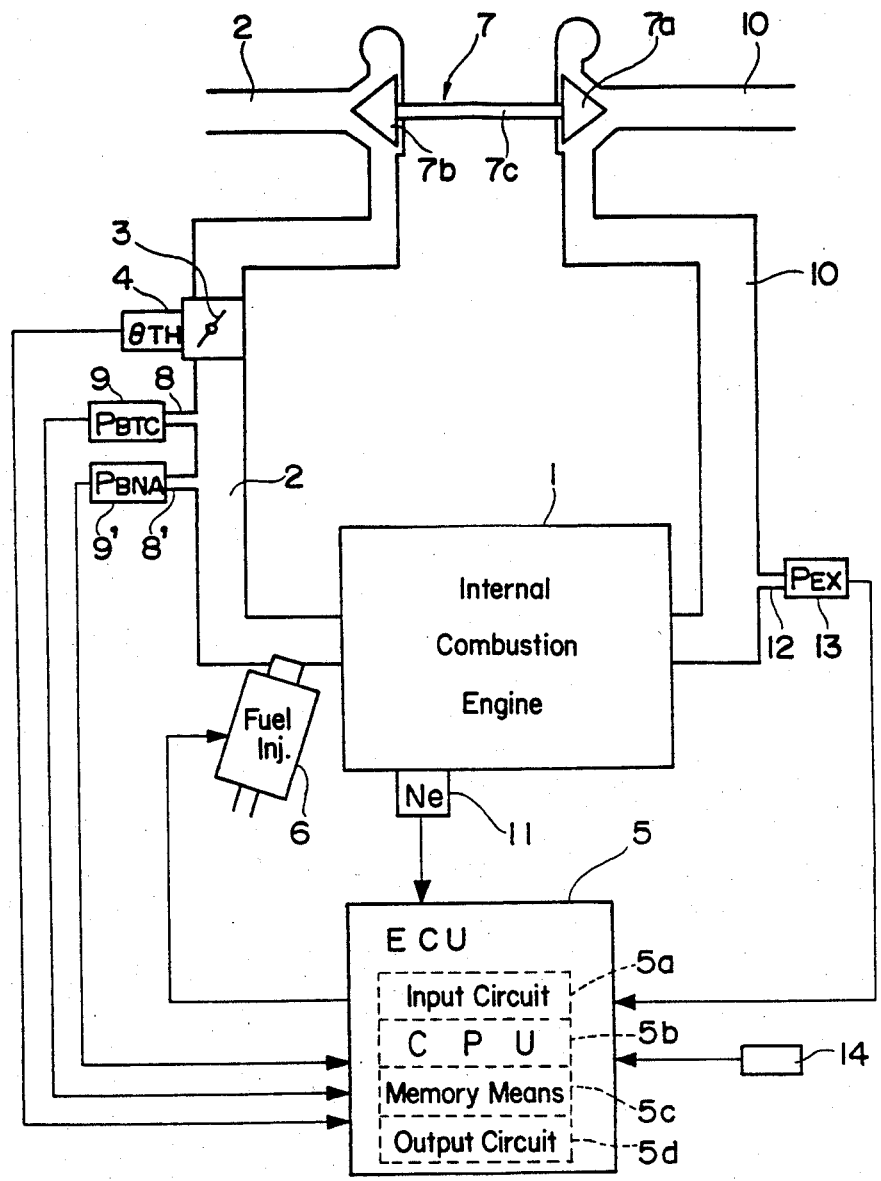
FIG. 1 is a block diagram of a fuel supply system to which the method of the present invention may be applied.

Referring now to the block diagram of a fuel supply controlling system shown in FIG. 1, an intake pipe 2 is connected to an internal combustion engine 1 of, for example, four cylinders. Further, a throttle valve 3 is provided at about the halfway point of the intake pipe 2 and a throttle valve opening (8TH) sensor 4 is attached to the throttle valve 3. The sensor 4 converts a valve opening of the throttle valve 3 into an electrical signal and sends the signal to an electronic control unit (hereinafter referred to as "ECU") 5. Also, a fuel injection valve 6 is attached to the intake pipe 2 and is connected electrically to the ECU 5 so that the valve opening time for fuel injection is controlled in accordance with a signal provided from the ECU 5.

In an exhaust pipe 10 of the engine 1 is a turbine 7a of a supercharger 7. The turbine 7a rotates because of the exhaust gas pressure from the engine 1. The rotation of the turbine is imparted to a compressor 7b by a rotating shaft 7c. The compressor 7b is located upstream of the throttle valve 3.

Downstream of the throttle valve 3 are located an absolute pressure ($P_{BTC}$) sensor 9 and an absolute pressure ($P_{BNA}$) sensor 9', which detect intake passage pressure through pipes 8 and 8', respectively. The absolute pressure ($P_{BTC}$) sensor 9 and absolute pressure ($P_{BNA}$) sensor 9' are provided respectively for supercharging pressure (high pressure) measurement and for low pressure meansurement in order to measure an internal pressure of the intake pipe accurately. The pressure of intake air varies over a wide range due to the provision of the supercharger 7 for the engine 1. The sensors 9 and 9' each provide a signal to the ECU 5, which indicates absolute pressure in the intake pipe.

In the body of the engine 1 an engine speed (Ne) sensor 11 is mounted around a cam shaft or crank shaft (not shown) of the engine. The engine speed sensor 11 outputs a crank angle position signal (hereinafter referred to as "TDC signal") in a predetermined crank angle position at every 180° rotation of the engine crank shaft. The TDC signal is generated at a crank angle position which corresponds to top dead center (TDC) of the piston at the starting time of the intake stroke in each cylinder. This TDC signal is sent to the ECU 5.

An exhaust gas pressure ($P_{EX}$) sensor 13 is connected to the exhaust pipe 10 through a pipe 12 and provides an exhaust gas pressure signal to the ECU 5.

The ECU 5 is connected to other engine operation parameter sensors 14 such as, for example, an engine water temperature sensor and an atmospheric pressure sensor. The other parameter sensors 14 provide detected signals to the ECU 5.

The ECU 5 includes an input circuit 5a which functions to effect waveform shaping for some of the input signals received from various sensors, correct the voltage level of the other input signals into a predetermined level or convert analog signal values to digital signal values. The ECU also includes a central processing unit (hereinafter referred to as "CPU") 5b, a memory means 5c which stores various operation programs to be executed in the CPU 5b and also stores operation results and an output circuit 5d which provides a driving signal to the fuel injection valve 6.

The CPU 5b calculates an opening time $T_{OUT}$ for the fuel injection valve 6 on the basis of engine operation parameter signals provided from the various sensors through the input circuit 5a and executes a program shown in terms of a flowchart in FIG. 2 as will be described hereinafter.

Figure 2:
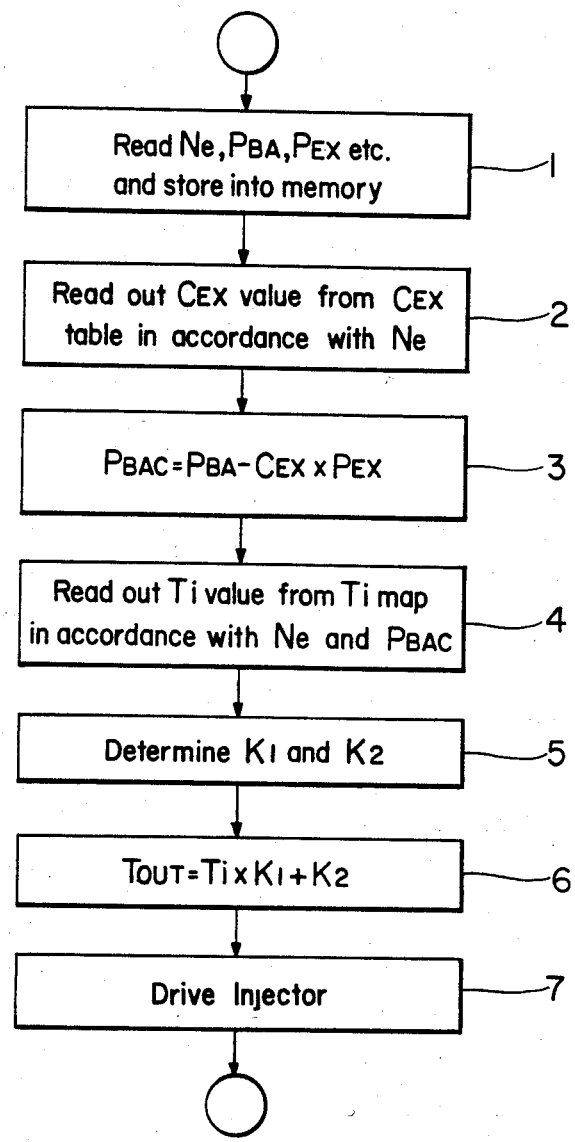
FIG. 2 is a flowchart of one embodiment of the present invention.

FIG. 2 shows a flowchart of a program according to the method of the invention used when control is made by the ECU 5 for the opening time of the fuel injection valve 6. This program is executed at every generation of the TDC signal by the Ne sensor 11.

According to step 1 of the method, an engine speed value Ne, an intra-intake pipe absolute pressure $P_{BA}$ and an exhaust gas pressure value $P_{EX}$, detected by the engine speed sensor 11, absolute pressure sensors 9, 9' and exhaust gas pressure sensor 13, respectively, are input to the ECU 5 and stored in the memory means 5c.

Figures 3, 4:
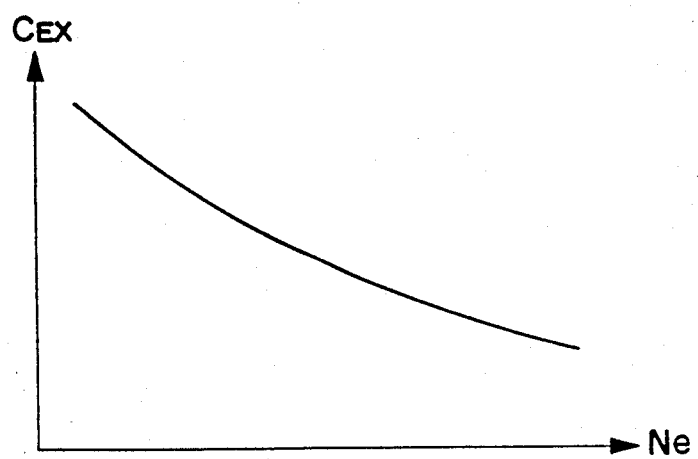
FIG. 3 is a graph depicting the back pressure correction coefficient as a function of engine speed.
FIG. 4 is a reference valve opening $T_i$ map depicting $T_i$ as a function of corrected intake passage absolute pressure and engine speed.

In step 2, a back pressure correction coefficient $C_{EX}$ as a function of engine speed Ne is read out from a $C_{EX}$ table, the values of which correspond to the graph in FIG. 3, so that the intra-intake pipe absolute pressure value $P_{BA}$ can be corrected accordingly. With the corrected intra-intake pipe absolute pressure, an amount of fuel according to an actual amount of fresh air introduced into an engine combustion chamber can be determined. The calculation is performed in the following manner.

The amount of fresh air Q is expressed by the following equation:

$$Q = \frac{1}{E-1} V_{ST}\left(P_{BA} - \frac{1}{E} P_R\right) \quad (1)$$

where,
E = compression ratio
$V_{ST}$ = stroke volume
$P_{BA}$ = absolute pressure in the intake pipe
$P_R$ = back pressure The back pressure P is expressed by the following equation:

$$P_R = \frac{T_{BA}}{T_{EX}} \cdot P_{EX} \quad (2)$$

where,
$T_{BA}$ = temperature in the intake pipe
$T_{EX}$ = temperature in the exhaust pipe
$P_{EX}$ = detected value of exhaust gas pressure Thus, the amount of fresh air, Q, is expressed by the following equation:

$$Q = \frac{1}{E-1} V_{ST}\left(P_{BA} - \frac{1}{E} \cdot \frac{T_{BA}}{T_{EX}} P_{EX}\right) \quad (3)$$

If the constant $$A = \frac{1}{E-1} \cdot V_{ST}$$

and the correction coefficient $$C_{EX} = \frac{1}{E} \cdot \frac{T_{BA}}{T_{EX}},$$

the amount of fresh air Q is expressed as follows:

$$Q = A(P_{BA} - C_{EX} \times P_{EX}) \quad (4)$$

In general, as the engine speed Ne increases, the amount of intake air increases so the intra-intake pipe temperature $T_{BA}$ falls, while the intra-exhaust pipe temperature $T_{EX}$ rises. Thus, the correction coefficient $$C_{EX}\left(=\frac{1}{E} \cdot \frac{T_{BA}}{T_{BX}}\right)$$

decreases gradually with increase of engine speed as shown in the graph of FIG. 3. The actual $C_{EX}$ table used by the program is determined by experiment on each individual engine because the characteristic curve differs according to engine specifications and other parameters.

Next, the program advances to step 3, in which the intra-intake pipe absolute pressure value $P_{BA}$ is corrected by the following equation (5) in accordance with the detected value of exhaust pressure $P_{EX}$:

$$P_{BAC} = P_{BA} - C_{EX} \times P_{EX} \quad (5)$$

where, $P_{BAC}$ = effective intra-intake pipe absolute pressure value From equation (5) it is seen that the $P_{BAC}$ value decreases and increases according to the increase and the decrease respectively of the $P_{EX}$ value or back pressure. Thus, step 3 is for compensating for a variation in the amount of fresh air introduced into the combustion chamber caused by a change in back pressure during a transfer from the state of normal operation to a state of acceleration or deceleration.

The program then advances to step 4, in which a reference valve opening time $T_i$ according to the engine speed Ne and the effective intra-intake pipe absolute pressure $P_{BAC}$ is read out from a $T_i$ map as shown in FIG. 4.

In step 5, a correction coefficient $K_1$ and a correction variable $K_2$ are determined according to engine operation parameter signals provided from various sensors. The coefficient $K_1$ and the variable $K_2$ are calculated on the basis of predetermined arithmetic expressions so as to afford optimum fuel consumption and exhaust gas characteristics according to operating conditions of the engine.

Next, the program advances to step 6, in which an opening time $T_{OUT}$ of the fuel injection valve 6 is calculated by the following equation:

$$T_{OUT} = T_i \times K_1 + K_2$$

Finally, in accordance with the valve opening time $T_{OUT}$ thus determined, the output circuit 5*d* in the ECU 5 provides a driving signal to the fuel injection valve 6 to control the opening time of that valve (step 7).

Although in this emobidment the operation control amount was assumed to be the amount of fuel to be supplied, this is not intended as a limitation. For example, the operation control amount may be the amount of intake air.

Thus, a method of controlling air/fuel mixture is disclosed which improves the drivability of the engine, especially during periods of acceleration and deceleration. While embodiments and applications of this invention have been disclosed and described, it would be apparent to those skilled in the art that many more modifications are possible without departing from the inventive concepts herein. The invention, therefore, is not to be restricted except in the spirit of the appended claims.

What is claimed is:

1. A method for controlling an operation control amount for an internal combustion engine having a supercharger, an intake passage and an exhaust passage, comprising,
   detecting an engine speed,
   detecting an absolute pressure in the intake passage of the engine,
   detecting an exhaust gas pressure in the exhaust passage of the engine,
   determining a correction value for said absolute pressure in the intake passage of the engine in accordance with said exhaust gas pressure and said absolute pressure in the intake passage of the engine,
   setting a basic control amount in accordance with said correction value for said absolute pressure in the intake passage of the engine,
   controlling the operational control amount in accordance with said basic control amount.

2. The method of claim 1, wherein said correction value for said absolute pressure in the intake passage of the engine is determined further in accordance with said engine speed.

3. The method of claim 1, wherein the operation control amount is an amount of fuel for the engine.

4. A method for controlling an operation control amount for an internal combustion engine having a supercharger, an intake passage and an exhaust passage, comprising,
   detecting an engine speed,
   detecting an absolute pressure in the intake passage of the engine,
   detecting an exhaust gas pressure in the exhaust passage of the engine,
   determining a correction coefficient,
   determining a correction value for said absolute pressure in the intake passage of the engine according to the following formula:

$$P_{BAC} = P_{BA} - C_{EX} \times P_{EX}$$

where,
   $P_{BAC}$ = correction value
   $P_{BA}$ = said absolute pressure in the intake passage
   $P_{EX}$ = said exhaust gas pressure
   $C_{EX}$ = said correction coefficient,
   setting a basic control amount in accordance with said correction value for said absolute pressure in the intake passage of the engine,
   controlling the operational control amount in accordance with said basic control amount.

5. The method of claim 4, wherein said correction coefficient is determined in accordance with engine speed.

6. The method of claim 4, wherein the operational control amount is an amount of fuel for the engine.

* * * * *